(12) United States Patent
Kano

(10) Patent No.: US 9,954,470 B2
(45) Date of Patent: Apr. 24, 2018

(54) APPARATUS FOR CONTROLLING ROTATING ELECTRIC MACHINE AND ELECTRICALLY-POWERED STEERING APPARATUS USING THE SAME

(71) Applicant: DENSO CORPORATION, Kariya, Aichi-pref. (JP)

(72) Inventor: Ryo Kano, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/616,623

(22) Filed: Jun. 7, 2017

(65) Prior Publication Data

US 2017/0359008 A1 Dec. 14, 2017

(30) Foreign Application Priority Data

Jun. 8, 2016 (JP) .................... 2016-114098

(51) Int. Cl.

| H02P 6/06 | (2006.01) |
|---|---|
| H02P 21/00 | (2016.01) |
| H02P 6/28 | (2016.01) |
| H02P 29/64 | (2016.01) |
| H02P 25/22 | (2006.01) |
| B62D 5/04 | (2006.01) |

(52) U.S. Cl.
CPC ............ H02P 6/28 (2016.02); B62D 5/0463 (2013.01); H02P 25/22 (2013.01); H02P 29/64 (2016.02)

(58) Field of Classification Search
CPC .. B62D 5/0463; B62D 5/0487; B62D 5/0496; B62D 5/0484; F02N 11/0814; F02N 11/0825; F02N 11/084; F02N 2200/044; F02N 2200/046; F02N 2200/061; F02N 2200/062; F02N 2200/063; F02N 2200/064

USPC ............... 318/139, 400.02, 434, 400.06
See application file for complete search history.

(56) References Cited

U.S. PATENT DOCUMENTS

| 9,534,574 B2* | 1/2017 | Maeda | F02N 11/0825 |
|---|---|---|---|
| 9,543,880 B2* | 1/2017 | Nakamura | H02P 29/032 |
| 9,660,560 B2* | 5/2017 | Kemp | H02P 6/153 |

(Continued)

FOREIGN PATENT DOCUMENTS

| JP | 2009-017707 | 1/2009 |
|---|---|---|
| JP | 4483298 | 6/2010 |

(Continued)

Primary Examiner — Paul Ip
(74) Attorney, Agent, or Firm — Knobbe, Martens, Olson & Bear, LLP

(57) ABSTRACT

An apparatus for controlling operation of a rotating electric machine including a plurality of winding sets. The apparatus includes a plurality of inverters for the respective winding sets and a control unit. The control unit includes a physical quantity comparator configured to compare physical quantities that are responsive to power supplied to the respective winding sets, a temperature estimator configured to estimate system temperatures that are temperatures of respective systems, each of which systems is a combination of a respective one of the plurality of winding sets and its associated components, and a parameter modifier configured to modify a parameter used to estimate a temperature of each system in response to a result of comparison between the physical quantities.

11 Claims, 10 Drawing Sheets

(56) References Cited

U.S. PATENT DOCUMENTS

| | | | |
|---|---|---|---|
| 2003/0169001 A1* | 9/2003 | Murakami | B60K 6/28 318/139 |
| 2005/0242760 A1* | 11/2005 | Fujita | H02P 23/14 318/434 |
| 2013/0285591 A1 | 10/2013 | Suzuki | |
| 2015/0229249 A1* | 8/2015 | Jang | H02P 6/08 318/139 |
| 2015/0292464 A1* | 10/2015 | Maeda | F02N 11/0825 290/38 E |
| 2016/0009314 A1* | 1/2016 | Muramatsu | H02P 29/68 701/41 |
| 2016/0043671 A1* | 2/2016 | Kemp | H02P 21/0089 318/400.02 |
| 2016/0126877 A1 | 5/2016 | Endoh | |
| 2017/0001661 A1* | 1/2017 | Nakamura | B62D 5/0496 |

FOREIGN PATENT DOCUMENTS

| | | |
|---|---|---|
| JP | 4483298 B | 6/2010 |
| JP | 2017-147840 | 8/2017 |

\* cited by examiner

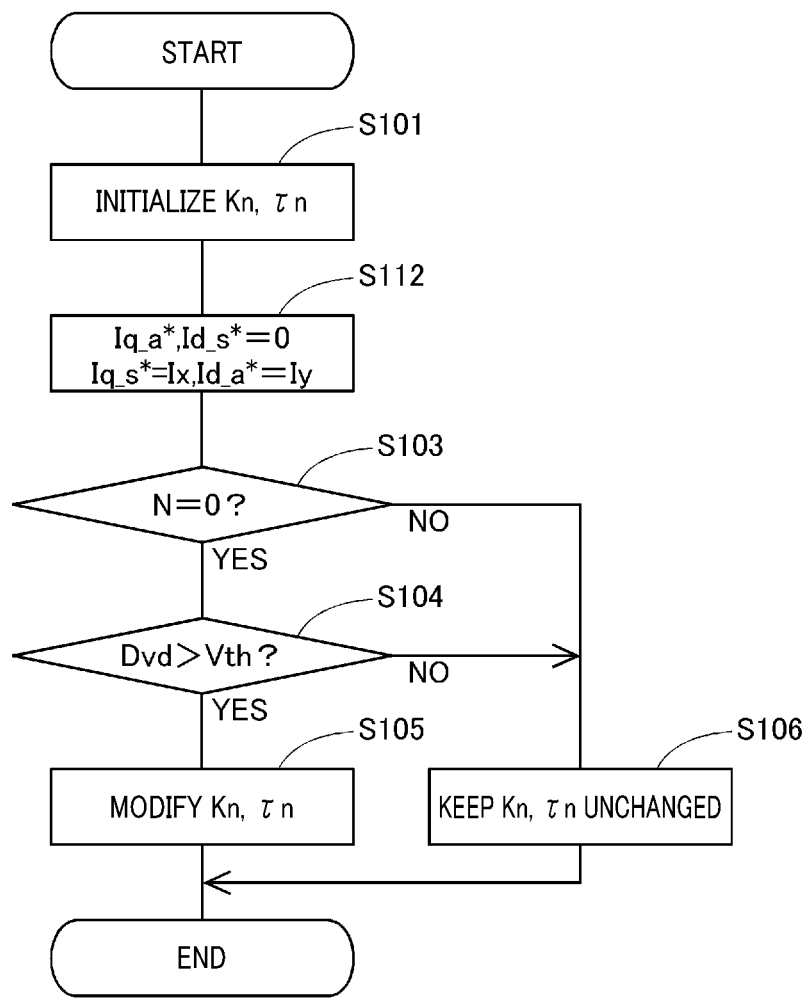

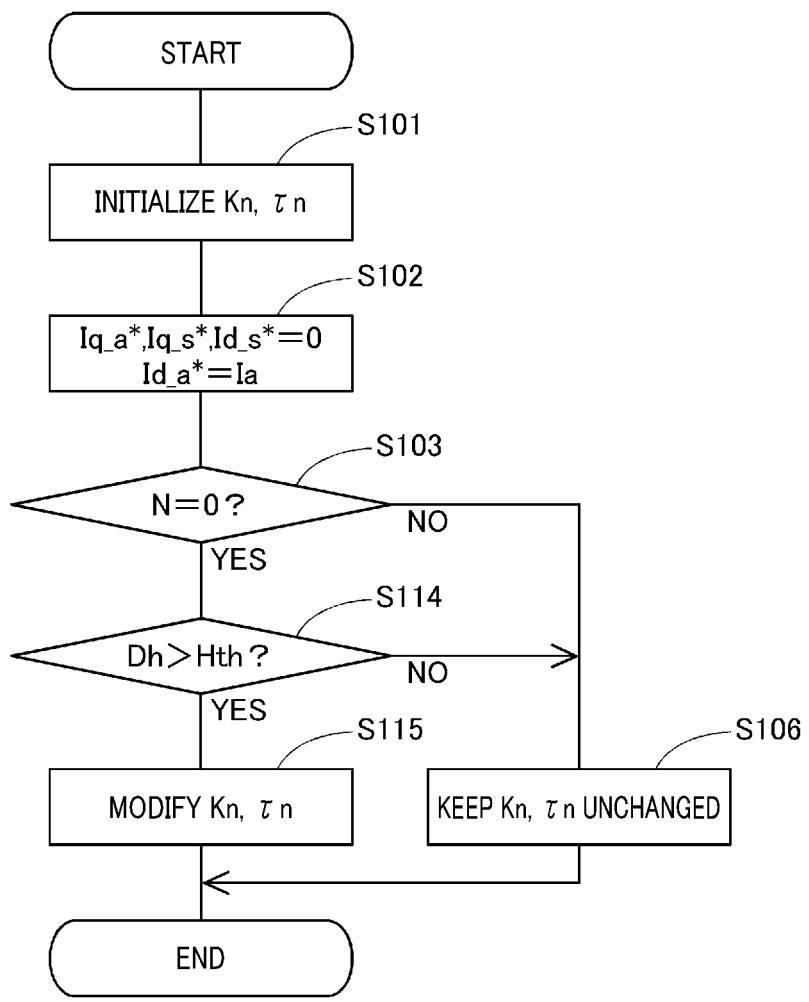

APPARATUS FOR CONTROLLING ROTATING ELECTRIC MACHINE AND ELECTRICALLY-POWERED STEERING APPARATUS USING THE SAME

CROSS-REFERENCE TO RELATED APPLICATION

This application is based on and claims the benefit of priority from earlier Japanese Patent Application No. 2016-114098 filed Jun. 8, 2016, the description of which is incorporated herein by reference.

BACKGROUND

Technical Field

The present invention relates to an apparatus for controlling a rotating electric machine and an electrically-powered steering apparatus using the same.

Related Art

Conventionally, several methods of estimating a motor coil temperature are known. For example, a method disclosed in Japanese Patent No. 4483298 inputs a time-average of the integral of the square of the amount of current flow through a motor coil over energization time to a first first-order lag function and then inputs an output of the first first-order lag function to a second first-order lag function to estimate a motor coil temperature using a sum of the output of the first first-order lag function and the output of the second first-order lag function.

In Japanese Patent No. 4483298, a time constant and a gain that specify the first order lag function are determined by adjustment using actual measurements. That is, in Japanese Patent No. 4483298, the time constant and the gain determined by actual measurements are continuously used for the temperature estimation without taking into account aging degradation or the like.

In consideration of the foregoing, exemplary embodiments of the present invention are directed to providing an apparatus for controlling a rotating electric machine, capable of accurately estimating a motor coil temperature, and an electrically-powered steering apparatus using the same.

SUMMARY

In accordance with an exemplary embodiment of the present invention, there is provided an apparatus for controlling operation of a rotating electric machine including a plurality of winding sets. The apparatus including: a plurality of inverters, each for a respective one of the plurality of winding sets; and a control unit. The control unit includes: a physical quantity comparator configured to compare physical quantities that are responsive to power supplied to the respective winding sets; a temperature estimator configured to estimate system temperatures that are temperatures of respective systems, each system being a combination of a respective one of the plurality of winding sets and its associated components; and a parameter modifier configured to modify a parameter used to estimate each system temperature in response to a result of comparison between the physical quantities.

In this configuration, the physical quantities are compared; parameters used for estimating the system temperatures are modified in response to a result of comparison between the physical quantities. With this configuration, the system temperatures can be accurately estimated taking into account manufacturing variations between the systems and variations between the systems caused by aging degradation.

BRIEF DESCRIPTION OF THE DRAWINGS

FIG. 9 is a flowchart of response constant setting processing in accordance with a third embodiment of the present invention; and FIG. 10 is a flowchart of response constant setting processing in accordance with a fourth embodiment of the present invention.

DESCRIPTION OF SPECIFIC EMBODIMENTS

With reference to the accompanying drawings, hereinafter are described several embodiments of the present invention. Substantially common elements or steps throughout the embodiments are assigned the same numbers and will not be redundantly described.

First Embodiment

A first embodiment of the present invention will now be described with reference to FIGS. 1 to 6.

Figure 1:
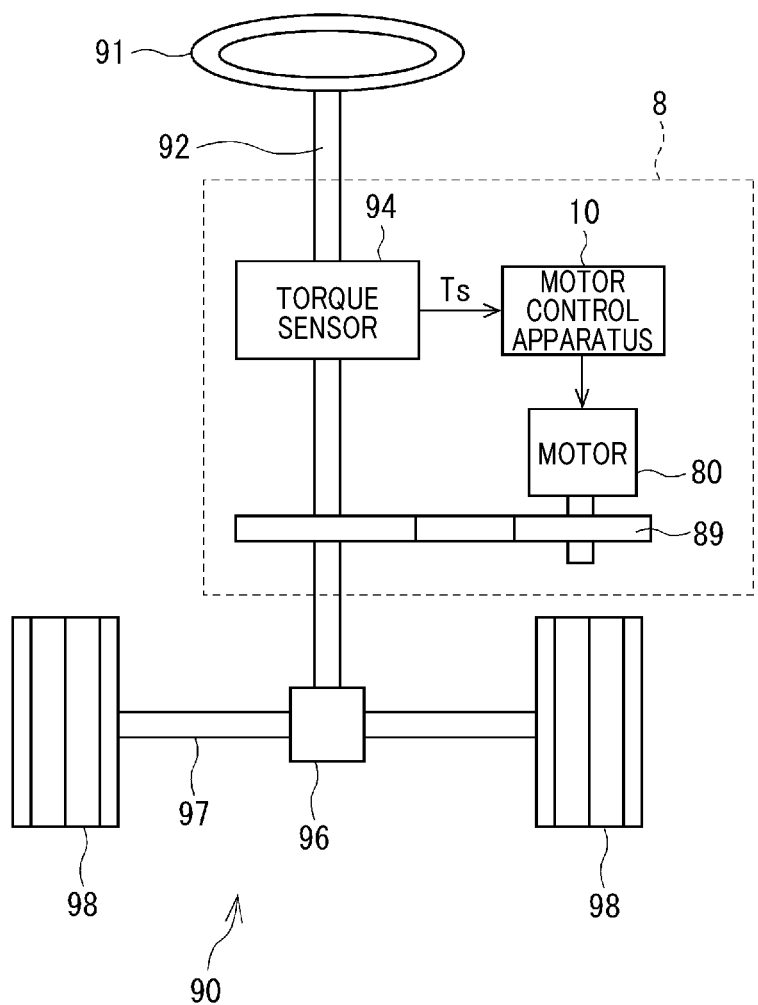
FIG. 1 is a schematic block diagram of a steering system in accordance with a first embodiment of the present invention.

As shown in FIG. 1, an electrically-powered steering apparatus 8 for assisting a vehicle driver in the steering operation includes a motor control apparatus 10 that serves as a control apparatus for a rotating electric machine, and a motor 80 that serves as the rotating electric machine.

FIG. 1 illustrates a steering system 90 including the electrically-powered steering apparatus 8. The steering system 90 includes a steering wheel 91, a steering shaft 92, a pinion gear 96, a rack shaft 97, wheels 98, and the electrically-powered steering apparatus 8, as steering members.

The steering wheel 91 is connected to the steering shaft 92. A torque sensor 94 is provided along the steering shaft 92 to detect a torque generated when the steering wheel 91 is operated by the driver. A pinion gear 96 is provided at the distal end of the steering shaft 92. The pinion gear 96 is engaged with the rack shaft 97. A pair of wheels 98 are coupled to the both ends of the rack shaft 97 via the tie rod.

When the driver rotates the steering wheel 91, the steering shaft 92 connected to the steering wheel 91 rotates. The rotational motion of the steering shaft 92 is converted to linear motion of the rack shaft 97 by the pinion gear 96. The pair of wheels 98 are steered at an angle depending on a displacement amount of the rack shaft 97.

The electrically-powered steering apparatus 8 includes a motor 80, a reduction gear 89 to slow down the rotation of the motor 80 and then transmit it to the steering shaft 92, and a motor control apparatus 10. In the present embodiment, the electrically-powered steering apparatus 8 is of a so-called column assist type to drive the steering shaft 92. Alternatively, the electrically-powered steering apparatus 8 may be of a so-called rack assist type to transmit the rotation of the motor 80 to the rack shaft 97, thereby driving the rack shaft 97.

The motor 80 outputs an assistance torque to assist the driver in steering the steering wheel 91. The motor 80 is supplied with power from a battery 5 (see FIG. 2) to be driven to rotate the reduction gear 89 back and forth.

Figure 2:
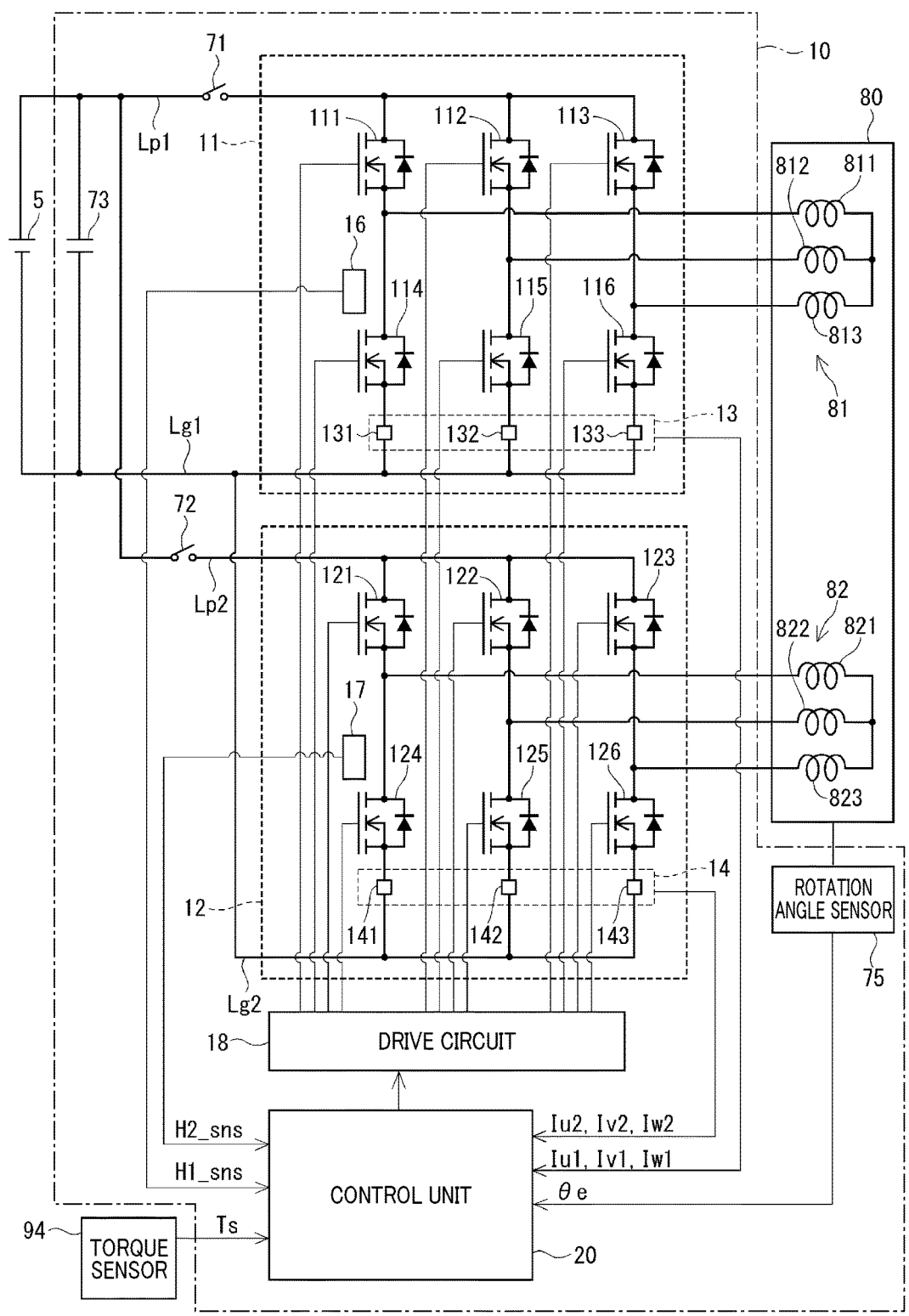
FIG. 2 is a circuit diagram illustrating a motor control apparatus of the first embodiment.

As shown in FIG. 2, the motor 80 is a three-phase brushless motor including two winding sets 81, 82.

The first winding set 81 includes a first U-phase coil 811, a first V-phase coil 812, and a first W-phase coil 813. One end of each of the coils 811, 812, 813 is connected to a first inverter 11, and the other ends of these coils are connected to each other.

The second winding set 82 includes a second U-phase coil 821, a second V-phase coil 822, and a second W-phase coil 823. One end of each of the coils 821, 822, 823 is connected to a second inverter 12, and the other ends of these coils are connected to each other.

In the present embodiment, the second winding set 82 is electrically offset from the first winding set 81 by a predetermined electrical angle (e.g., 30 degrees) and supplied with power out of phase accordingly with power to be supplied to the first winding set 81.

The motor control apparatus 10 includes a first inverter 11, a second inverter 12, temperature detectors 16, 17, and a control unit 20.

The first inverter 11 is provided for the first winding set 81, and the second inverter 12 is provided for the second winding set 82. In the following, a first system refers to a combination of the first winding set 81 and the first inverter 11 provided for the first winding set 81. A second system refers to a combination of the second winding set 82 and the second inverter 12 provided for the first winding set 82. To distinguish between a component for the first system and a component for the second system, the component for the first system and the component for the second system are labeled with "first" and "second", respectively, as appropriate. In addition, to distinguish between parameters for the first system and parameters for the second system, parameters for the first system and parameters for the second system are labeled with suffixes "1" and "2", respectively, as appropriate.

The first inverter 11, which is a three-phase inverter, includes switching elements 111-116, where the switching elements 111-113 are high side connected and the switching elements 114-116 are low side connected.

A connection point of a pair of U-phase switching elements 111, 114 is electrically connected to the first U-phase coil 811, a connection point of a pair of V-phase switching elements 112, 115 is electrically connected to the first V-phase coil 812, and a connection point of a pair of W-phase switching elements 113, 116 is connected to the first W-phase coil 813.

The second inverter 12, which is a three-phase inverter, includes switching elements 121-126, where the switching elements 121-123 are high side connected and the switching elements 124-126 are low side connected.

A connection point of a pair of U-phase switching elements 121, 124 is electrically connected to the first U-phase coil 821, a connection point of a pair of V-phase switching elements 122, 125 is electrically connected to the first V-phase coil 822, and a connection point of a pair of W-phase switching elements 123, 126 is connected to the first W-phase coil 823.

In the present embodiment, each of the switching elements 111-116, 121-126 is a metal-oxide semiconductor field-effect transistor (MOSFET). Alternatively, each of the switching elements 111-116, 121-126 may be an insulated gate bipolar transistor (IGBT), a thyristor or the like.

A high side line Lp1 connecting the switching elements 111-113 is electrically connected to a positive terminal of the battery 5. A power supply relay 71 is provided along the high side line Lp1. A high side line Lp2 connecting the switching elements 121-123 is electrically connected to the positive terminal of the battery 5. A power supply relay 72 is provided along the high side line Lp2. Each of the power supply relays 71, 72 may be a mechanical relay or may be a MOSFET or the like. In cases where MOSFETs are used as the power supply relays 71, 72, it is desirable to provide a polarity-reversal protection relay having a parasitic diode as an anti-parallel diode for preventing a reverse current from flowing when the battery 5 is incorrectly connected in the reverse direction.

The capacitor 73 is connected in parallel with the inverters 11, 12.

The first current detector 13 includes current detection elements 131-133. The current detection element 131 is connected between the switching element 114 and a ground line Lg1 to detect a first U-phase current Iu1 flowing through the first U-phase coil 811. The current detection element 132 is connected between the switching element 115 and the ground line Lg1 to detect a first V-phase current Iv1 flowing through the first V-phase coil 812. The current detection element 133 is connected between the switching element 116 and the ground line Lg1 to detect a first W-phase current Iw1 flowing through the first W-phase coil 813.

The second current detector 14 includes current detection elements 141-143. The current detection element 141 is connected between the switching element 124 and a ground line Lg2 to detect a second U-phase current Iu2 flowing through the second U-phase coil 821. The current detection element 142 is connected between the switching element 125 and the ground line Lg2 to detect a second V-phase current Iv2 flowing through the second V-phase coil 822. The current detection element 143 is connected between the switching element 126 and the ground line Lg2 to detect a second W-phase current Iw2 flowing through the second W-phase coil 823.

In the present embodiment, each of the current detection elements 131-133 and 141-143 is a shunt resistor. Alternatively, each of the current detection elements 131-133 and 141-143 may be a Hall element or the like. A result of detection by each of the current detectors 13, 14 is output to the control unit 20.

Figure 4:
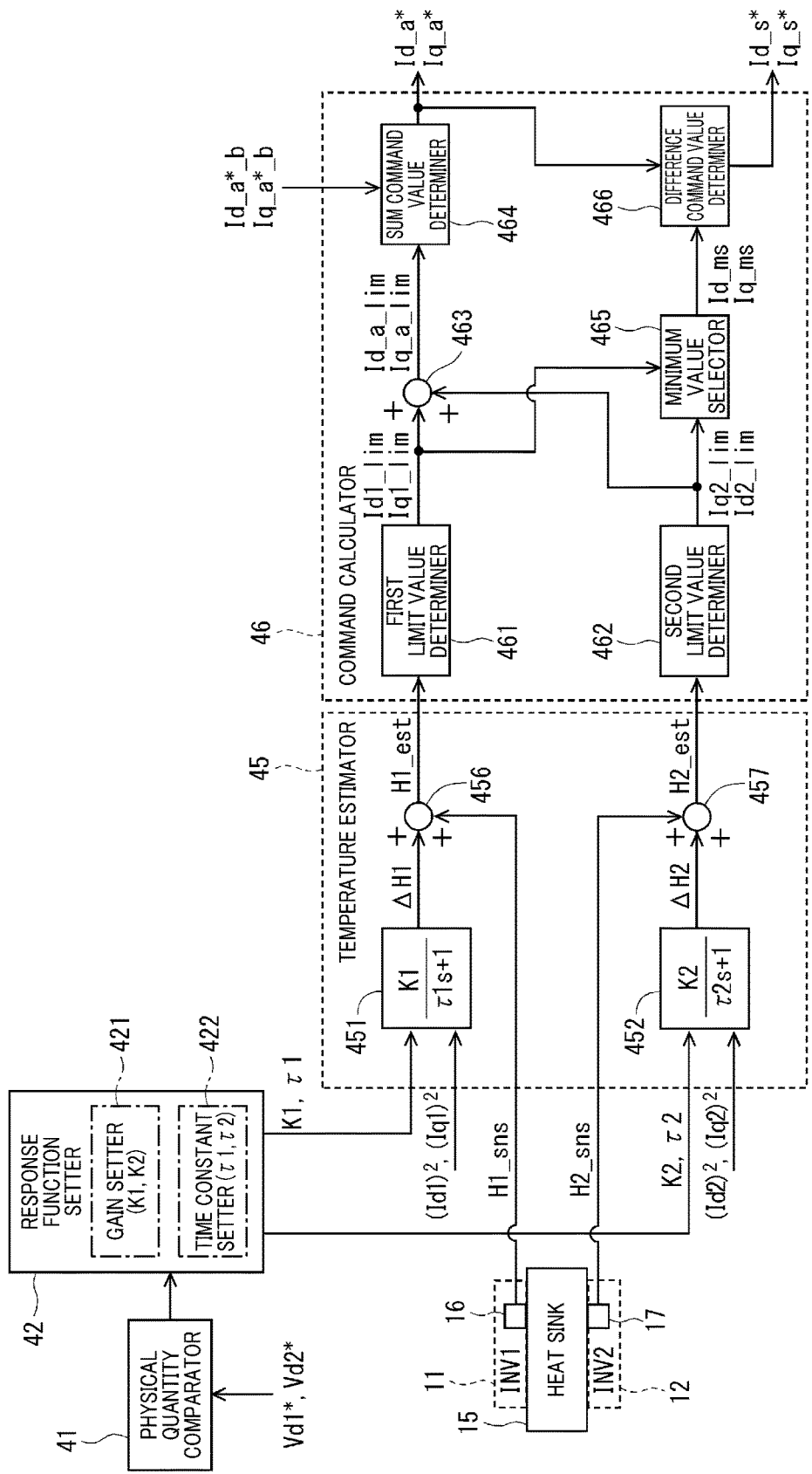
FIG. 4 is a functional block diagram illustrating temperature estimation and current limiting of the first embodiment.

The first inverter 11 and the second inverter 12 are located so that they can dissipate heat onto a heat sink 15 (see FIG. 4).

As shown in FIGS. 2 and 4, the first temperature detector 16 is provided in a region where elements of the first inverter 11 are disposed, to detect a temperature of the region of the heat sink 15 in which the first inverter 11 is located. The temperature detected by the first temperature detector 16 is a first temperature sense value H1_sns.

The second temperature detector 17 is provided in a region where elements of the second inverter 12 are disposed, to detect a temperature of the region of the heat sink 15 in which the first inverter 12 is located. The temperature detected by the first temperature detector 17 is a second temperature sense value H2_sns.

The first temperature sense value H1_sns is treated as a base temperature for the transient temperature rise in the first system. The second temperature sense value H2_sns is treated as a base temperature for the transient temperature rise in the second system.

FIG. 4 schematically illustrates that the inverters 11, 12 are disposed on opposite sides of the heat sink 15. That is, the inverter 11 is disposed on one side of the head sink 15, and the inverter 12 is disposed on the other side of the heat sink 15. Alternatively, the inverters 11, 12 may be located in separate regions on the same side of the heat sink 15 respectively corresponding to the first and second systems. FIGS. 2 and 4 illustrate that the temperature detectors 16, 17 are respectively disposed within the inverters 11, 12. Practically, the temperature detectors 16, 17 only have to be located in separate regions respectively corresponding to the first and second systems such that the base temperatures for the first and second systems can be detected.

Figure 3:
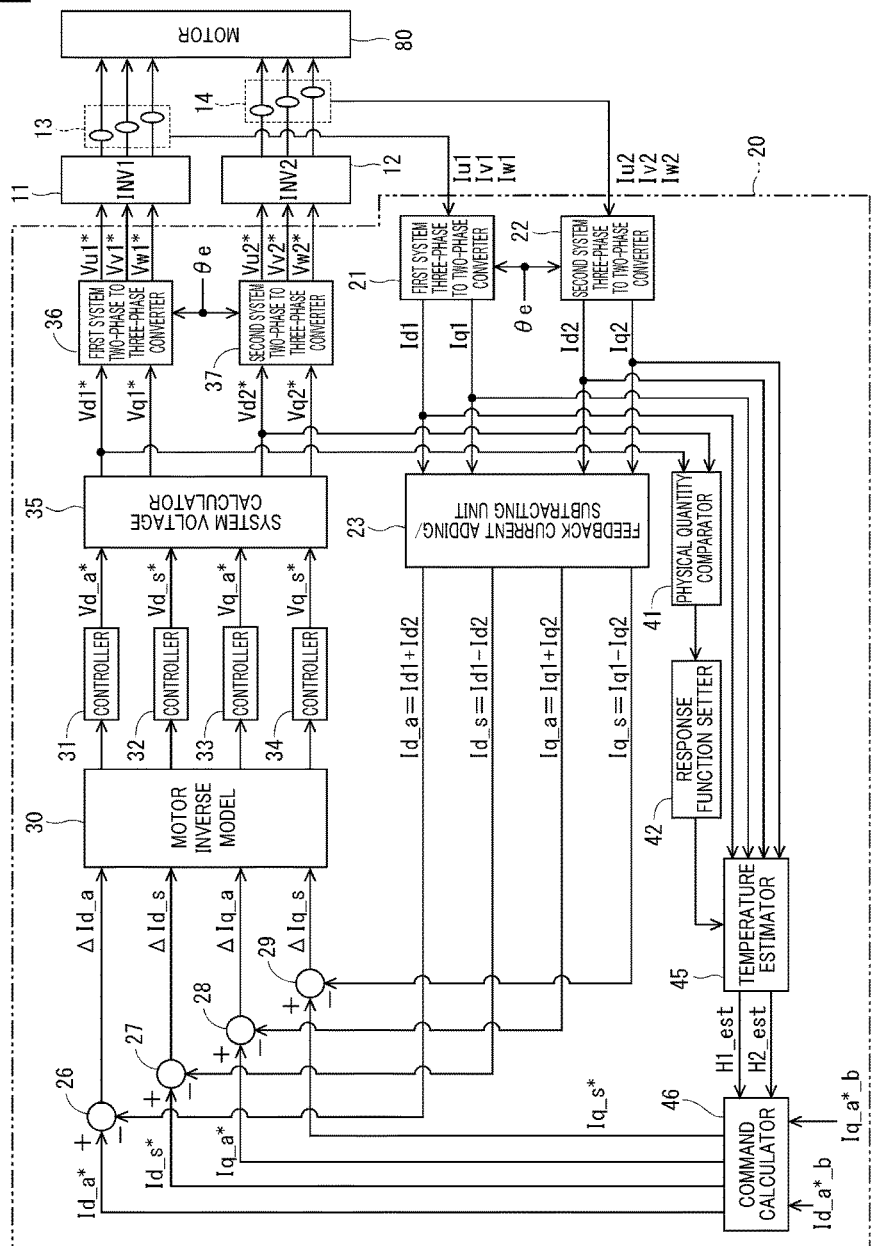
FIG. 3 is a block diagram of a control unit of the first embodiment.

As shown in FIGS. 2 and 3, the control unit 20 is mainly configured as a microcomputer including a central processing unit (CPU), a read-only memory (ROM), a random-access memory (RAM), and other components. Various processing to be performed in the control unit 20 may be implemented by the CPU executing computer programs stored in the ROM or the like, or may be implemented by dedicated electronic circuitry.

The control unit 20 controls the operation of the motor 80 via current feedback control based on a steering torque Ts acquired from the torque sensor 94, an electrical angle θe acquired from a rotation angle sensor 75, and phase currents Iu1, Iv1, Iw1, Iu2, Iv2, Iw2 acquired from the current detectors 13, 14.

The control unit 50 described later controls the operation of the motor 80 via similar current feedback control.

As shown in FIG. 3, the control apparatus 20 includes three-phase to two-phase converters 21, 22, feedback current adding/subtracting unit 23, subtractors 26-29, a motor inverse model 30, controllers 31-34, a system voltage calculator 35, two-phase to three-phase converters 36, 37, a physical quantity comparator 41, a response function setter 42 as a parameter modifier, a temperature estimator 45, a command calculator 46 as a current limiter. In the present embodiment, the control unit 20 is configured to control a sum and a difference of the currents of the first and second systems.

The first-system three-phase to two-phase converter 21 dq-converts the phase currents Iu1, Iv1, Iw1 based on the electrical angle θe to calculate a first d-axis current sense value Id1 and a first q-axis current sense value Iq1.

The second-system three-phase to two-phase converter 22 dq-converts the phase currents Iu2, Iv2, Iw2 based on the electrical angle θe to calculate a second d-axis current sense value Id2 and a second q-axis current sense value Iq2.

The feedback current adding/subtracting unit 23 calculates a d-axis current sum value Id_a, a d-axis current difference value Id_s, a q-axis current sum value Iq_a, and a q-axis current difference value Iq_s (see equations (1-1)-(1-4)).

$$Id\_a = Id1 + Id2 \tag{1-1}$$

$$Id\_s = Id1 - Id2 \tag{1-2}$$

$$Iq\_a = Iq1 + Iq2 \tag{1-3}$$

$$Iq\_s = Iq1 - Iq2 \tag{1-4}$$

The subtractor 26 calculates a deviation ΔId_a between a d-axis current sum command value Id_a* and the d-axis current sum value Id_a.

The subtractor 27 calculates a deviation ΔId_s between a d-axis current difference command value Id_s* and the d-axis current difference value Id_s.

The subtractor 28 calculates a deviation ΔIq_a between a q-axis current sum command value Iq_a* and the q-axis current sum value Iq_a.

The subtractor 29 calculates a deviation ΔIq_s between a q-axis current difference command value Iq_s* and the q-axis current difference value Iq_s.

The motor inverse model 30 and the controllers 31-34 calculate a d-axis voltage sum command value Vd_a*, a d-axis voltage difference command value Vd_s*, a q-axis voltage sum command value Vq_a*, and a q-axis voltage difference command value Vq_s*, based on the deviations ΔId_a, ΔId_s, ΔIq_a, and ΔIq_s.

The d-axis voltage sum command value Vd_a*, the d-axis voltage difference command value Vd_s*, the q-axis voltage sum command value Vq_a*, and the q-axis voltage difference command value Vq_s* are calculated according to the equations (2-1)-(2-4) or according to the equations (3-1)-(3-4).

$$Vd\_a^* = \{R \times \Delta Id\_a + (L+M)s \times \Delta Id\_a - \omega(L+M) \times \Delta Iq\_a\} \times (Km/s) \tag{2-1}$$

$$Vd\_s^* = \{R \times \Delta Id\_s + (L-M)s \times \Delta Id\_s - \omega(L-M) \times \Delta Iq\_s\} \times (Km/s) \tag{2-2}$$

$$Vq\_a^* = \{R \times \Delta Iq\_a + (L+M)s \times \Delta Iq\_a + \omega(L+M) \times \Delta Id\_a\} \times (Km/s) + 2\omega\varphi \tag{2-3}$$

$$Vq\_s^* = \{R \times \Delta Iq\_s + (L-M)s \times \Delta Iq\_s + \omega(L-M) \times \Delta Id\_s\} \times (Km/s) \tag{2-4}$$

$$Vd\_a^* = \{R \times \Delta Id\_a + (L+M)s \times \Delta Id\_a\} \times (Km/s) - \omega(L+M) \times \Delta Iq\_a \tag{3-1}$$

$$Vd\_s^* = \{R \times \Delta Id\_s + (L-M)s \times \Delta Id\_s\} \times (Km/s) - \omega(L-M) \times \Delta Iq\_s \tag{3-2}$$

$$Vq\_a^* = \{R \times \Delta Id\_a + (L+M)s \times \Delta Iq\_a\} \times (Km/s) + \omega(L+M) \times \Delta Id\_a + 2\omega\Phi \tag{3-3}$$

$$Vq\_s^* = \{R \times \Delta Id\_s + (L-M)s \times \Delta Iq\_s\} \times (Km/s) + \omega(L-M) \times \Delta Id\_s \tag{3-4}$$

In the above equations, R represents a resistance, L represents a self-inductance, M represents a mutual inductance, s represents a Laplace variable, Km represents a gain, ω represents an electrical angular speed, and φ represents the number of armature flux linkages, as described in, for example, Japanese Patent Application Laid-Open Publication No. 2013-230019.

It should be noted that the gain Km is different from a gain regarding temperature estimation described later.

The system voltage calculator 35 converts the d-axis voltage sum command value Vd_a*, the d-axis voltage difference command value Vd_s*, the q-axis voltage sum command value Vq_a*, and the q-axis voltage difference command value Vq_s* into a first d-axis voltage command value Vd1*, a first q-axis voltage command value Vq1*, a second d-axis voltage command value Vd2*, and a second q-axis voltage command value Vq2*.

The first system two-phase to three-phase converter 36 inversely dq converts the first d-axis voltage command value Vd1* and the first q-axis voltage command value Vq1* based on the electrical angle θe to calculate three-phase first voltage command values Vu1*, Vv1*, Vw1*.

The second system two-phase to three-phase converter 37 inversely dq converts the second d-axis voltage command value Vd2* and the second q-axis voltage command value Vq2* based on the electrical angle θe to calculates three-phase second voltage command values Vu2*, Vv2*, Vw2*.

The control unit 20 generates a control signal for the first inverter 11 based on the first voltage command values Vu1*, Vv1*, Vw1*, to control the ON/OFF operation of the switching elements 111-116 via the drive circuit 18 (not shown in FIG. 3). The control unit 20 generates a control signal for the second inverter 12 based on the second voltage command values Vu2*, Vv2*, Vw2*, to control the ON/OFF operation of the switching elements 121-126 via the drive circuit 18 (not shown in FIG. 3).

As shown in FIG. 4, the physical quantity comparator 41 compares a physical quantity of the first system and a physical quantity of the second system. In the present embodiment, the physical quantity comparator 41 compares the first d-axis voltage command value Vd1* and the second d-axis voltage command value Vd2*.

The response function setter 42 includes a gain setter 421 and a time constant setter 422.

The gain setter 421 sets a gain Kn used for temperature estimation based on a result of comparison by the physical quantity comparator 41.

The time constant setter 422 sets a time constant τn used for the temperature estimation based on the result of comparison by the physical quantity comparator 41.

In the present embodiment, the gain Kn and the time constant τn are response constants. Modifying at least one of the gain and the time constant corresponds to modifying at least one of the response constants.

Regarding the notation, the suffix "n" of the gain Kn is a system index. That is, the gain used for the first system temperature estimation is a first gain K1. The gain used for second system temperature estimation is a second gain K2. The suffix "n" of the time constant τn is a system index. That is, the time constant used for the first system temperature estimation is a first time constant τ1, and the time constant used for the second system temperature estimation is a second time constant τ2. This notation is also applied to an amount of temperature change ΔHn, a temperature sense value Hn_sns and a temperature estimation value Hn_est.

The temperature estimator 45 estimates a first system temperature H1 and a second system temperature H2 that are temperatures of the respective systems. More specifically, the temperature estimator 45 includes first order lag calculators 451, 452 and adders 456, 457, to calculate the first temperature estimation value H1_est and the second temperature estimation value H2_est. In the present embodiment, the first temperature estimation value H1_est is a temperature of the first inverter 11, and the second temperature estimation value H2_est is a temperature of the second inverter 12.

The first order lag calculator 451 receives current square values $(Id1)^2$, $(Iq1)^2$, the gain K1, and the time constant τ1, calculates a first order lag response to the received current square values using a transfer function $\{K1/(\tau 1s+1)\}$, and outputs an amount of temperature change ΔH1. In the present embodiment, the individual current square values $(Id1)^2$, $(Iq1)^2$, or a sum of the current square values, i.e., $(Id1)^2+(Iq1)^2$, may be input to the. First order lag calculator 451.

The first order lag calculator 452 receives current square values $(Id2)^2$, $(Iq2)^2$, the gain K2, and the time constant τ2, calculates a first order lag response to the received current square values using a transfer function $\{K2/(\tau 2s+1)\}$, and outputs an amount of temperature change ΔH2. In the present embodiment, the individual current square values $(Id2)^2$, $(Iq2)^2$, or a sum of the current square values, i.e., $(Id2)^2+(Iq2)^2$, may be input to the first order lag calculator 452.

Such calculation of the first order lag responses is performed every time interval of tens to hundreds milliseconds to transiently estimate the temperature rise.

The adder 456 adds the first temperature sense value H1_sns and the amount of temperature change ΔH1 to calculate the first temperature estimation value H1_est.

The adder 457 adds the second temperature sense value H2_sns and the amount of temperature change ΔH2 to calculate the second temperature estimation value H2_est.

The command calculator 46 includes a first limit value determiner 461, a second limit value determiner 462, an adder 463, a sum command value determiner 464, a minimum value selector 465, and a difference command value determiner 466.

The first limit value determiner 461 determines a first q-axis current limit value Iq1_lim based on the first temperature estimation value H1_est.

The second limit value determiner 462 determines a second q-axis current limit value Iq2_lim based on the second temperature estimation value H2_est.

The current limit values Iq1_lim, Iq2_lim are determined to increase with increasing temperature estimation values H1_est, H2_est, respectively.

The adder 463 adds the q-axis current limit values Iq1_lim and Iq2_lim to calculate a q-axis current sum limit value Iq_a_lim.

The sum command value determiner 464 calculates a q-axis current sum command value Iq_a*, where if a pre-limiting q-axis current sum command value Iq_a*_b determined based on the torque command value is greater than the q-axis current sum limit value Iq_a_lim, the q-axis current sum command value Iq_a* is set to the q-axis current sum limit value Iq_a_lim, and if the pre-limiting q-axis current sum command value Iq_a*_b is equal to or less than the q-axis current sum limit value Iq_a_lim, the q-axis current sum command value Iq_a* is simply set to the pre-limiting q-axis current sum command value Iq_a*_b.

The minimum value selector 465 selects a smaller one of the q-axis current limit values Iq1_lim and Iq2_lim to output a selected value Iq_ms.

The difference command value determiner 466 determines a q-axis current difference command value Iq_s* based on the q-axis current sum command value Iq_a* and the selected value Iq_ms. If the q-axis current sum command value Iq_a* is equal to or less than twice the selected value Iq_ms, then the q-axis current difference command value Iq_s* is set to zero. If the q-axis current sum command value Iq_a* is greater than twice the selected value Iq_ms, then the q-axis current difference command value Iq_s* is set to a value determined according to the equation (4). If the selected value Iq_ms is a value of the first system, the q-axis current difference command value Iq_s* is negative. If the selected value Iq_ms is a value of the second system, then the q-axis current difference command value Iq_s* is positive.

$$Iq\_s^* = Iq\_ms \cdot 2 - Iq\_a^* \quad (4)$$

In the above, calculation of the q-axis current sum command value Iq_a* and the q-axis current difference command value Iq_s* has been described. Additionally, in a similar manner, a d-axis current sum command value Id_a* and a d-axis current difference command value Id_s* are also calculated by replacing the index "q" with the index "d".

Figure 5:
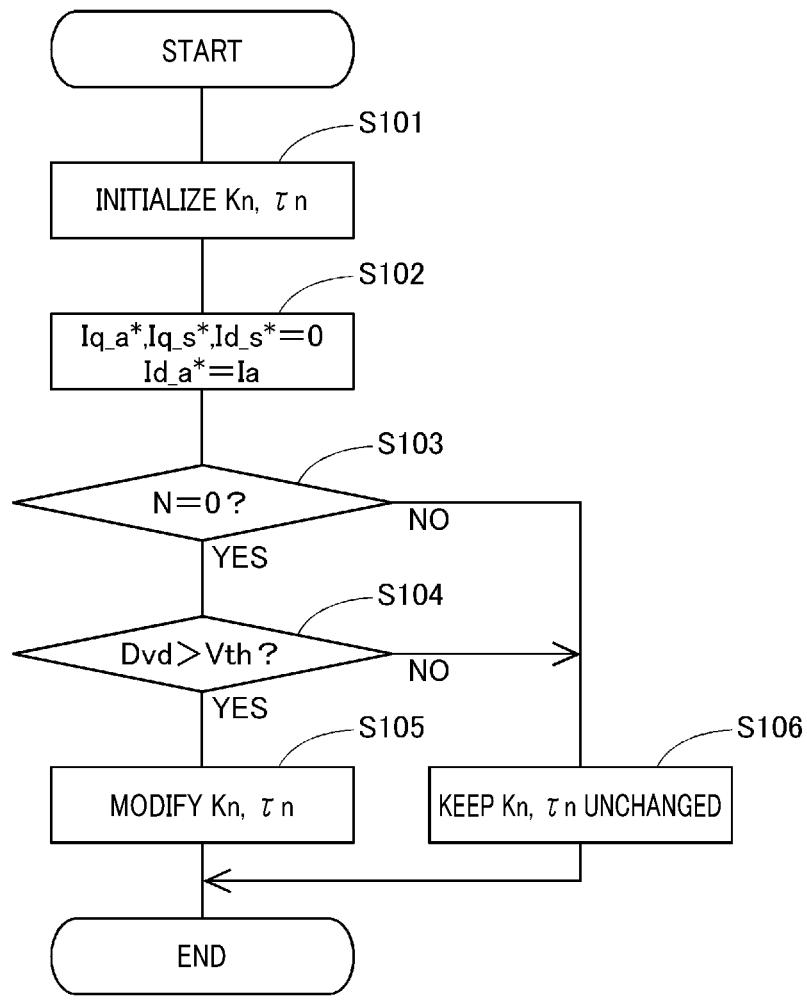
FIG. 5 is a flowchart of response constant setting processing of the first embodiment.

Response constant setting processing of the present embodiment will now be described with reference to a flowchart of FIG. 5. This processing is performed in the control unit 20 when a start switch, such as an ignition switch, is turned on.

In step S101, the response function setter 42 sets an initial value of each of the gain Kn and the time constant τn. These initial values may be values determined by adaptation or previously calculated values.

In step S102, the sum command value determiner 464 sets the q-axis current sum command value Iq_a* to zero, and the difference command value determiner 466 sets the q-axis current difference command value Iq_s* to zero, whereby the q-axis current flow through each of the winding sets 81, 82 is set to zero. The sum command value determiner 464 sets the d-axis current sum command value Id_a* to a predetermined value Ia, and the difference command value determiner 466 sets the d-axis current difference command value Id_s* to zero, whereby the d-axis current is set constant.

In step S103, the control unit 20 determines whether or not the rotational speed N of the motor 80 is zero. if in step S103 it is determined that the rotational speed N is less than a rotational speed decision threshold preset depending on detection errors, the rotational speed N is assumed to be zero. If in step S103 it is determined that the rotational speed N is not zero (step S103; NO), the process flow proceeds to step S106. If in step S103 it is determined that the rotational speed N is zero (step S103; YES), the process flow proceeds to step S104.

In step S104, the physical quantity comparator 41 determines whether or not a d-axis voltage deviation Dvd (see the following equation (5)) that is an absolute value of a difference between the first d-axis voltage command value Vd1* and the second d-axis voltage command value Vd2* is greater than a voltage deviation decision threshold Vth.

$$Dvd=|Vd1^*-Vd2^*| \qquad (5)$$

If in step S104 it is determined that the d-axis voltage deviation Dvd is equal to or less than the voltage deviation decision threshold Vth (step S104; NO), the process flow proceeds to step S106. If in step S104 it is determined the d-axis voltage deviation Dvd is greater than the voltage deviation decision threshold Vth (step S104; YES), the process flow proceeds to step S105.

In step S105, the response function setter 42 modifies the gain Kn and the time constant τn used for the temperature estimation based on a result of comparison between the first d-axis voltage command value Vd1* and the second d-axis voltage command value Vd2*. In the present embodiment, the response function setter 42 modifies the gain Kn and the time constant τn of the system having a larger one of the d-axis voltage command values Vd1*, Vd2* so that the gain Kn is increased above the initial value and the time constant τn is decreased below the initial value. The response function setter 42 does not modify the gain Kn and the time constant τn of the system having a smaller one of the d-axis voltage command values Vd1*, Vd2* are not modified.

Figure 6:
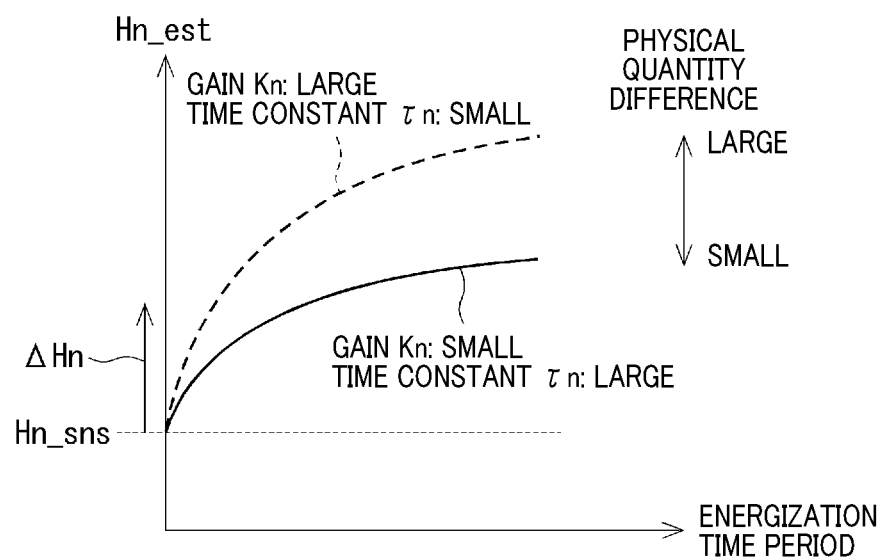
FIG. 6 is a graph illustrating estimated temperatures of the first embodiment.

In the system where the gain Kn and the time constant τn are to be modified, values of the gain Kn and the time constant τn are calculated based on a map or function of the d-axis voltage deviation Dvd. In the present embodiment, the gain Kn is increased and the time constant τn is decreased with increasing d-axis voltage deviation Dvd. As shown in FIG. 6, as the amount of temperature change ΔHn is increased by increasing the gain Kn and decreasing the time constant τn, the temperature estimation value Hn_est is estimated high.

In step S106, the response function setter 42 does not modify the gain Kn and the time constant τn from the initial values set in step S101.

In the present embodiment, the d-axis voltage command values Vd1*, Vd2* are compared as physical quantities of the systems, and based on the d-axis voltage deviation Dvd, the gain Kn and the time constant τn used for the temperature estimation are modified, which allows the temperatures of the respective systems to be calculated properly taking into account manufacturing variations between the systems and variations between the systems caused by aging deterioration. Therefore, as compared to when both the first and second systems are current limited in the same manner that is adapted for the system having a larger temperature rise, exceeding current limiting in the system having a smaller temperature rise can be avoided, which allows the motor 80 to exhibit its performance effectively.

As described above, a motor control apparatus 10 of the present embodiment is configured to control the motor 80 having a plurality of winding sets 81, 82 and includes a plurality of inverters 11, 12 and the control unit 20.

The inverters 11, 12 are provided, each for a respective winding set. That is, the inverter 11 is provided for the winding set 81, and the inverter 12 is provided for the winding set 82.

In the present embodiment, a combination of the winding set 81 and its associated components and a combination of the winding set 82 and its associated components form different systems.

The components associated with the winding set 81 and the components associated with the winding set 82 do not have to be provided on separate members. For example, the first inverter 11 may be provided in a region of the heat sink 15 and the second inverter 11 may be provided in another region of the same heat sink 15.

The control unit 20 includes the physical quantity comparator 41, the temperature estimator 45, and the response function setter 42.

The physical quantity comparator 41 compares physical quantities that are responsive to power supplied to the respective winding sets 81, 82.

The temperature estimator 45 estimates the system temperature Hn that is a temperature of each system.

The response function setter 42 modifies the gain Kn and the time constant τn that are parameters used for estimating the system temperature Hn (n=1, 2), based on a result of comparison between the physical quantities.

In the present embodiment, the physical quantities are compared, and based on the comparison, the parameters used for estimating the system temperature Hn of each system are modified. With this configuration, the system temperature Hn of each system can be accurately estimated taking into account manufacturing variations between the systems and variations between the systems caused by aging degradation. Therefore, exceeding current limiting caused by anticipating extra temperature rise can be avoided, which allows the motor 80 to exhibit its performance effectively.

The physical quantities to be compared in the present embodiment are the d-axis voltage command values Vd1*, Vd2* that are applied to the winding sets 81, 82, respectively. That is, in the present embodiment, voltage values when the same constant current is passed through the first system and the second system are compared as the physical quantities. With this configuration, the parameters used for estimating the system temperature Hn (n=1, 2) can be modified properly. In addition, physical quantities used for normal motor control are compared, which can eliminate the need for additional processing and sensors and thus can simplify the configuration. Further, the response constant setting processing is performed when the start switch is turned on or every predetermined time interval, whereby the system temperatures Hn can be properly estimated taking into account temperature variations between the systems caused by aging degradation.

The physical quantity comparator 41 compares the physical quantities when d-axis current is passed through each of the winding sets 81, 82 with zero q-axis current flowing through each of the winding sets 81, 82. With configuration, the gain Kn and the time constant τn can be modified based on the result of comparison between the physical quantities, without generating any torque in the motor 80.

The physical quantity comparator 41 compares the physical quantities when the rotational speed N of the motor 80 is zero. When a constant current is passed through the motor 8 while the rotational speed N of the motor 80 is zero, that is, the motor 80 is in a locked state, the inductance L is less affected and the voltage is substantially proportional to the resistance. Thus, comparing the physical quantities (e.g. voltages) in the motor lock state allows variations in the system temperatures H1, H2 caused by variations in the resistance between the systems to be detected. Therefore, modifying the parameters used for estimating the system temperature Hn based on the comparison of the physical quantities in the motor lock state allows the system temperatures Hn to be estimated more properly.

The motor control apparatus 10 includes the temperature detectors 16, 17. The temperature detectors 16, 17 detect temperatures of respective regions of the heat sink 15, where the inverter 11 is provided in one of the regions and the inverter 12 is provided in the other of the regions.

The temperature estimator 45 includes the first order lag calculators 451, 452. The first order lag calculator 451 receives square values $(Id1)^2$, $(Iq1)^2$ of currents passed through the first winding set 81 to output an amount of temperature change ΔH1 as a first order lag response. The first order lag calculator 452 receives square values $(Id2)^2$, $(Iq2)^2$ of currents passed through the second winding set 82 to output an amount of temperature change ΔH2 as a first order lag response. Alternatively, the current square values may be replaced with time-averaged values of integrals of the respective current square values.

The temperature estimator 45 adds an amount of temperature change ΔHn to the base temperature to estimate a system temperature Hn (n=1, 2). More specifically, the temperature estimator 45 adds an amount of temperature change ΔH1 to a temperature sense value H1_sns that is a sense value of the base temperature of the first system to calculate a first temperature estimation value H1_est. Meanwhile, the temperature estimator 45 adds an amount of temperature change ΔH2 to a temperature sense value H2_sns that is a sense value of the base temperature of the second system to calculate a second temperature estimation value H2_est.

With this configuration, the system temperature Hn can be properly estimated.

The control unit 20 includes the command calculator 46. The command calculator 46 limits the currents passed through the winding sets 81, 82 of the respective systems based on the system temperatures Hn (n=1, 2). In the present embodiment, setting a difference voltage command value Id_s* to be non-zero, i.e., Iq_s*≠0, can limit the currents of the respective systems (see Equation (4)). With this configuration, the currents of the respective systems can be appropriately limited depending on the system temperatures Hn (n=1, 2). Therefore, as compared to when both the first and second systems are current limited in the same manner that is adapted for the system having a larger temperature rise, exceeding current limiting in the system having a smaller temperature rise can be avoided, which allows the motor 80 to exhibit its performance effectively. Overheating in the system where a large amount of heat is generated can thereby be avoided.

The electrically-powered steering apparatus 8 includes the motor control apparatus 10 and the motor 80, and the reduction gear 89 that is a power transmitter. The motor 80 generates an assistance torque for assisting the driver in steering. The reduction gear 89 transmits the rotation of the motor 80 to the steering shaft 92.

In the present embodiment, the system temperatures H1, H2 can be properly estimated taking into account manufacturing variations between the systems and variations between the systems caused by aging degradation, which allows the motor 80 to exhibit its performance effectively. Steering can thereby be assisted properly.

Second Embodiment

A second embodiment of the present invention will now be described with reference to FIGS. 7 and 8.

Figure 7:
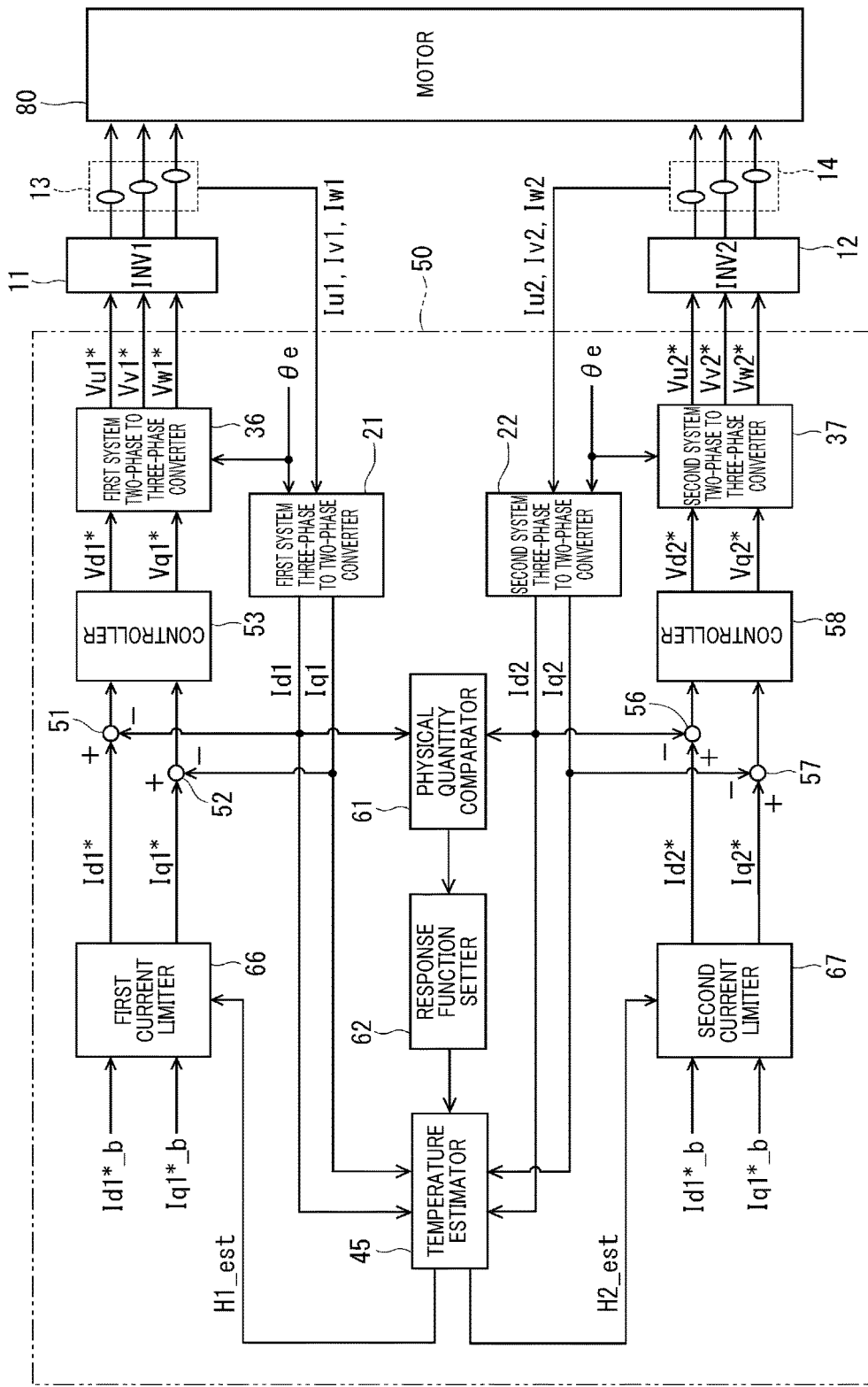
FIG. 7 is a block diagram of a control unit in accordance with a second embodiment of the present invention.
Figure 8:
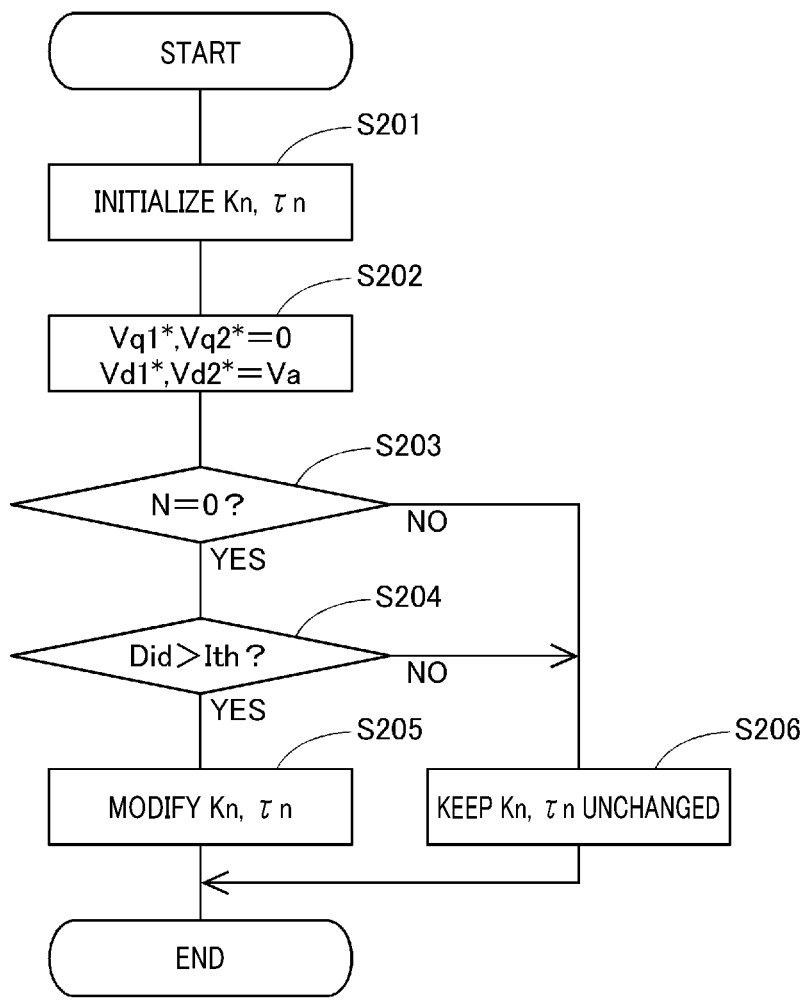
FIG. 8 is a flowchart of response constant setting processing of the second embodiment.

As shown in FIG. 7, a control unit 50 of the present embodiment includes three-phase to two-phase converters 21, 22, subtractors 51, 52, 56, 57, controllers 53, 58, two-phase to three-phase converters 36, 37, a physical quantity comparator 61, a response function setter 62 as a parameter modifier, a temperature estimator 45, and current limiters 66, 67. In the present embodiment, current feedback control is performed in each of the first and second systems.

The subtractor 51 calculates a deviation ΔId1 between a first d-axis current command value Id1* and a first d-axis current sense value Id1.

The subtractor 52 calculates a deviation ΔIq1 between a first q-axis current command value Iq1* and a first q-axis current sense value Iq1.

The controller 53 calculates a first d-axis voltage command value Vd1* and a first q-axis voltage command value Vq1* using PI calculation or the like so that the deviations ΔId1, ΔIq1 converge to zero.

The subtractor 56 calculates a deviation ΔId2 between a second d-axis current command value Id2* and a second d-axis current sense value Id2.

The subtractor 57 calculates a deviation ΔIq2 between a second q-axis current command value Iq2* and a second q-axis current sense value Iq2.

The controller 58 calculates a second d-axis voltage command value Vd2* and a second q-axis voltage command value Vq2* using PI calculation or the like so that the deviations ΔId2, ΔIq2 converge to zero.

The physical quantity comparator 61 compares the first d-axis current sense value Id1 and the second d-axis current sense value Id2.

The response function setter 62 sets a gain Kn and a time constant τn based on a result of comparison by the physical quantity comparator 61. The temperature estimator 45 calculates a temperature estimation value Hn_est using the gain Kn and the time constant τn set by the response function setter 62, as in the first embodiment.

The first current limiter 66, as in the processing by the first limit value determiner 461, determines a first q-axis current limit value Iq1_lim based on the first temperature estimation value H1_est. If a first pre-limiting q-axis current command value Iq1*_b determined based on a torque command value and others is greater than the first q-axis current limit value Iq1_lim, the first current limiter 66 sets a first q-axis current command value Iq1* to the first q-axis current limit value Iq1_lim. If the first pre-limiting q-axis current command value Iq1*_b is equal to or less than the first q-axis current limit value Iq1_lim, the first current limiter 66 simply sets the first q-axis current command value Iq1* to the first pre-limiting q-axis current command value Iq1*_b.

The second current limiter 67, as in the processing by the second limit value determiner 462, determines a second q-axis current limit value Iq2_lim based on the second temperature estimation value H2_est. If a second pre-limiting q-axis current command value Iq2*_b determined based on a torque command value and others is greater than the second q-axis current limit value Iq2_lim, the second current limiter 67 sets a second q-axis current command value Iq2* to the second q-axis current limit value Iq2_lim. If the second pre-limiting q-axis current command value Iq2*_b is equal to or less than the second q-axis current limit value Iq2_lim, the second current limiter 67 simply sets the second q-axis current command value Iq2* to the second pre-limiting q-axis current command value Iq2*_b.

In the above, calculation of the q-axis current command values Iq1*, Iq2* has been described. Additionally, in a similar manner, a d-axis current command values Id1*, Id2* are also calculated by replacing the index "q" with the index "d".

Response constant setting processing of the present embodiment will now be described with reference to a flowchart of FIG. 8. This processing is performed in the control unit 20 when a start switch, such as an ignition switch, is turned on.

In step S201, as in step S101, the response function setter 62 sets an initial value of each of the gain Kn and the time constant τn. These initial values may be values determined by adaptation or previously calculated values.

In step S202, the controller 50 sets the q-axis voltage command values Vq1*, Vq2* to zero, whereby the q-axis voltage to be applied to the winding set 82 is set to zero. The d-axis voltage command values Vd1*, Vd2* are set to a predetermined value Va, whereby the d-axis voltage is set constant.

In step S203, as in step S103, the control unit 50 determines whether or not the rotational speed N of the motor 80 is zero. If in step S203 it is determined that the rotational speed N is less than a rotational speed decision threshold preset depending on detection errors, the rotational speed N is assumed to be zero. If in step S203 it is determined that the rotational speed N is not zero (step S203; NO), the process flow proceeds to step S206. If in step S203 it is determined that the rotational speed N is zero (step S203; YES), the process flow proceeds to step S204.

In step S204, the physical quantity comparator 61 determines whether or not a d-axis current deviation Did (see the following equation (6)) that is an absolute value of a difference between the first d-axis current sense value Id1 and the second d-axis current sense value Id2 is greater than a voltage deviation decision threshold Vth.

$$Did=|Id1-Id2| \quad (6)$$

If in step S204 it is determined that the d-axis current deviation Did is equal to or less than the current deviation decision threshold Ith (step S204; NO), the process flow proceeds to step S206. If in step S204 it is determined that the d-axis current deviation Did is greater than the current deviation decision threshold Ith (step S204; YES), the process flow proceeds to step S205.

In step S205, the response function setter 62 modifies the gain Kn and the time constant τn based on a result of comparison between the first d-axis current sense value Id1 and the second d-axis current sense value Id2. In the present embodiment, the response function setter 62 modifies the gain Kn and the time constant τn of the system having a smaller one of the d-axis current sense values Id1, Id2 so that the gain Kn is increased above the initial value and the time constant τn is decreased below the initial value. The response function setter 62 does not modify the gain Kn and the time constant τn of the system having a larger one of the d-axis current sense values Id1, Id2.

In the system where the gain Kn and the time constant τn are to be modified, values of the gain Kn and the time constant τn are calculated based on a map or function of the d-axis current deviation Did. In the present embodiment, the gain Kn is increased and the time constant τn is decreased with increasing d-axis current deviation Did. As the amount of temperature change ΔHn is increased by increasing the gain Kn and decreasing the time constant τn, the temperature estimation value Hn_est is estimated high (see FIG. 6).

In step S206, the response function setter 62 does not modify the gain Kn and the time constant τn from the initial values set in step S201.

The physical quantities to be compared in the present embodiment are the d-axis current sense values Id1, Id2 that are passed through the winding sets 81, 82, respectively. That is, in the present embodiment, current values when the same constant voltage is applied to the first and second systems are compared as the physical values. With this configuration, the parameters used for estimating the system temperatures Hn (n=1, 2) can be modified properly. In addition, values used for normal motor control are compared, which can eliminate the need for additional processing and sensors and thus can simplify the configuration.

The second embodiment can exhibit the similar advantages to those of the first embodiment.

Third Embodiment

A third embodiment of the present invention will now be described with reference to FIG. 9. The present embodiment is similar to the first embodiment except that the response constant setting processing is different. Therefore, the description of FIG. 9 will focus on the response constant setting processing.

The response constant setting processing of the present embodiment will be described with reference to a flowchart of FIG. 9. The flowchart of FIG. 9 is similar to the flowchart of FIG. 5 except that step S112 is different from step S102.

In step S112, the sum command value determiner 464 sets the q-axis current sum command value Iq_a* to zero. In the present embodiment, the q-axis current difference command value Iq_s* is set to a predetermined value Ix. The sum command value determiner 464 sets the d-axis current sum command value Id_a* to a predetermined value Iy and sets the d-axis current difference command value Id_s* to zero.

The physical quantity comparator 41 compares the physical quantities when the sum of the q-axis currents passed through the respective winding sets 81, 82 is zero. With this configuration, the gain Kn and the time constant τn can be modified based on the result of comparison between the physical quantities without generating any torque in the motor 80. In addition, the voltage and current values of the q-axis can be used as the physical values.

The third embodiment can exhibit the similar advantages to those of the first embodiment.

Fourth Embodiment

A fourth embodiment of the present invention will now be described with reference to FIG. 10. The present embodiment is similar to the first embodiment except that the response constant setting processing is different. Therefore, the description of FIG. 10 will focus on the response constant setting processing.

The response constant setting processing of the present embodiment will be described with reference to a flowchart of FIG. 10. The flowchart of FIG. 10 is similar to the flowchart of FIG. 5 except that steps S114, S115 are respectively different from steps S104, S105.

In step S114, the physical quantity comparator 41 determines whether or not a temperature deviation Dh (see the following equation (7)) that is an absolute value of a difference between a first temperature sense value H1_sns and a second temperature sense value H2_sns is greater than a temperature deviation decision threshold Hth.

$$Dh=|H1\_sns-H2\_sns| \quad (7)$$

If it is determined that the temperature deviation Dh is equal to or less than the temperature deviation decision threshold Hth (step S114; NO), the process flow proceeds to step S106. If it is determined that the temperature deviation Dh is greater than the temperature deviation decision threshold Hth (step S114; YES), the process flow proceeds to step S115.

In step S115, the response function setter 42 modifies the gain Kn and the time constant τn based on a result of comparison between the first temperature sense value H1_sns and the second temperature sense value H2_sns. In the present embodiment, the response function setter 42 modifies the gain Kn and the time constant τn of the system having a higher one of the temperature sense values H1_sns, H2_sns so that the gain Kn is increased above the initial value and the time constant τn is decreased below the initial value. The response function setter 42 does not modify the gain Kn and the time constant τn of the system having a lower one of the temperature sense values H1_sns, H2_sns are not modified.

The present embodiment has been described as a modification to the first embodiment. Alternatively, the present embodiment may be described as a modification to the second embodiment, where steps S204, S205 of FIG. 8 are replaced with steps S114, S115. Still alternatively, the present embodiment may be described as a modification to the third embodiment, where steps S104, S105 of FIG. 9 are replaced with steps S114, S115.

The motor control apparatus 10 includes the temperature detectors 16, 17. The temperature detectors 16, 17 detect temperatures of respective regions of the heat sink 15, where the inverter 11 is provided in one of the regions and the inverter 12 is provided in the other of the regions.

The physical quantities take values respectively depending on temperature sense values acquired from the temperature detectors 16, 17. The physical quantities of the present embodiment are the first temperature sense value H1_sns and the second temperature sense value H2_sns. The temperatures of regions of the heat sink 15 respectively corresponding the first and second systems may vary with amount of current supply to the respective systems and may thus be included in the physical quantities as a function of power supplied to the respective winding sets. Each of the temperature sense values H1_sns, H2_sns corresponds to a base temperature of the corresponding system. The fourth embodiment can exhibit similar advantages to those of the first embodiment.

Modifications (M1) Physical Quantity Comparator

In the above embodiments, the d-axis voltage command values and the d-axis current command values have been described as the physical quantities. Alternatively, the voltage values and current values may be command values, sense values, estimation values, or values calculated using these values. Still alternatively, the physical quantities may include values related to the q-axis voltages or the q-axis currents. The physical quantities may include values related to the phase voltages or phase currents if there are no phase differences between the systems. The physical quantity comparator 41 compares the physical quantities when the rotational speed N of the motor 80 is zero. Alternatively, the physical quantity comparator may compare the physical quantities when the rotational speed N of the motor 80 is non-zero.

(M2) Parameter Modifier

In the first embodiment, if a difference between voltage values of the respective systems is greater than the voltage deviation decision threshold, the gain of the system having a larger one of the voltage values is increased and the time constant of the same system is decreased. Alternatively, if a difference between voltage values of the respective systems is greater than the voltage deviation decision threshold, the gain of the system having a smaller one of the voltage values is decreased and the time constant of the same system is increased. Still alternatively, if a difference between voltage values of the respective systems is greater than the voltage deviation decision threshold, the gain and the time constant of each of the systems may be modified.

In the second embodiment, if a difference between current values of the respective systems is greater than the current deviation decision threshold, the gain of the system having a smaller one of the current values is increased and the time constant of the same system is decreased. Alternatively, if a difference between current values of the respective systems is greater than the current deviation decision threshold, the gain of the system having a larger one of the current values is decreased and the time constant of the same system is increased. Still alternatively, if a difference between current values of the respective systems is greater than the current deviation decision threshold, the gain and the time constant of each of the systems may be modified.

In the fourth embodiment, if a difference between base temperatures of the respective systems is greater than the temperature deviation decision threshold, the gain of the system having a higher one of the base temperatures is increased and the time constant of the same system is decreased. Alternatively, if a difference between base temperatures of the respective systems is greater than the temperature deviation decision threshold, the gain of the system having a lower one of the base temperatures is decreased and the time constant of the same system is increased. Still alternatively, if a difference between base temperatures of the respective systems is greater than the temperature deviation decision threshold, the gain and the time constant of each of the systems may be modified.

In the above embodiments, the response function setter modifies the gain and the time constant of the first order lag calculator in response to a result of comparison between the physical quantities. Alternatively, the response function setter may modify either the gain or the time constant of the first order lag calculator in response to a result of comparison between the physical quantities. Still alternatively, parameters used for estimating the system temperature, other than the gain and the time, may be modified in response to a result of comparison between the physical quantities.

In the above embodiments, the response constant setting processing is performed when a start switch is turned on. Alternatively, the response constant setting processing may be performed when the rotating electric machine is driven in a certain state.

(M3) Temperature Detectors

In the above embodiments, the temperature detectors are provided for the respective systems. Alternatively, only one temperature detector may be provided unless the base temperatures of the respective systems are used as the physical quantities. In the case where only one temperature detector is provided, the temperature estimation values of the respective systems may be calculated by adding an amount of temperature change of each system to a common temperature sense value.

In the above embodiments, each temperature detector detects a temperature of a region of the heat sink where a corresponding inverter is provided. Alternatively, each temperature detector may detect a temperature of a region other than the heat sink, such as a substrate on which a corresponding inverter is provided, as a base temperature.

(M4) Rotating Electric Machine and Control Apparatus for the Rotating Electric Machine In the above embodiments, the operation of the rotating electric machine is controlled by current feedback control. Alternatively, a method of controlling the rotating electric machine may be based on any other control.

In the above embodiments, the rotating electric machine includes two winding sets. Alternatively, the rotating electric machine may include more than two winding sets. For example, the rotating electric machine may include three winding sets. In the above embodiments, the rotating electric machine is a three-phase brushless motor. Alternatively, the rotating electric machine may be a four-phase motor. As another alternative, the rotating electric machine may be any other type of motor other than the brushless motor. The rotating electric machine may not be a motor, but may be an alternator, or may be a motor generator having functions of an electrical motor and an alternator.

In the above embodiments, the rotating electric machine is applied to the electrically-powered steering apparatus. Alternatively, the rotating electric machine driving apparatus may be applied to any other devices other than the electrically-powered steering apparatus.

It is to be understood that the invention is not to be limited to the specific embodiments disclosed above and that modifications and other embodiments are intended to be included within the scope of the appended claims.

What is claimed is:

1. An apparatus for controlling operation of a rotating electric machine including a plurality of winding sets, the apparatus comprising:
    a plurality of inverters, each for a respective one of the plurality of winding sets; and
    a control unit comprising:
        a physical quantity comparator configured to compare physical quantities that are responsive to power supplied to the respective winding sets;
        a temperature estimator configured to estimate system temperatures that are temperatures of respective systems, each system being a combination of a respective one of the plurality of winding sets and its associated components; and
        a parameter modifier configured to modify a parameter used to estimate each system temperature in response to a result of comparison between the physical quantities.

2. The apparatus according to claim 1, wherein each of the physical quantities is a value associated with voltage applied to a respective one the plurality of the winding sets.

3. The apparatus according to claim 1, wherein each of the physical quantities is a value associated with current passed through a respective one of the plurality of the winding sets.

4. The apparatus according to claim 1, further comprising a temperature detector configured to detect a base temperature that is a temperature of a region where a respective one of the inverters is provided, and
    each of the physical quantities is a temperature sense value of the region detected by the temperature detector.

5. The apparatus according to claim 1, wherein the physical quantity comparator is configured to compare the physical quantities as d-axis current is passed through the respective winding sets in a zero q-axis current condition.

6. The apparatus according to claim 1, wherein the physical quantity comparator is configured to compare the physical quantities as a sum of q-axis currents passed through the respective winding sets is zero.

7. The apparatus according to claim 1, wherein the physical quantity comparator is configured to compare the physical quantities as a rotational speed of the rotating electric machine is zero.

8. The apparatus according to claim 1, further comprising a temperature detector configured to detect a base temperature that is a temperature of a region where a respective one of the inverters is provided,
    the temperature estimator comprises a first order lag calculator configured to receive a square value of current passed through each winding set or a time-averaged value of integral of current passed through each winding set to output a first order lag response as an amount of temperature change, and is configured to add the amount of temperature change to the base temperature to estimate the system temperature, and
    the parameter modifier is configured to modify a response constant of the first order lag calculator in response to a result of comparison between the physical quantities.

9. The apparatus according to claim 1, wherein the control unit comprises a current limiter configured to, for each of the systems, limit the current passed through the winding set of the system based on the system temperature.

10. An electrically-powered steering apparatus comprising:
    a rotating electric machine configured to generate an assistance torque for assisting a vehicle driver in steering;
    a power transmitter configured to transmit the rotation of the rotating electric machine to a driven object; and
    an apparatus for controlling operation of the rotating electric machine including a plurality of winding sets, the apparatus comprising a plurality of inverters, each for a respective one of the plurality of winding set, and a control unit comprising:

a physical quantity comparator configured to compare physical quantities that are responsive to power supplied to the respective winding sets;

a temperature estimator configured to estimate system temperatures that are temperatures of respective systems, each system being a combination of a respective one of the plurality of winding sets and its associated components; and a parameter modifier configured to modify a parameter used to estimate each system temperature in response to a result of comparison between the physical quantities.

11. A control unit for controlling operation of a plurality of inverters, each for a respective one of a plurality of winding sets incorporated in a rotating electric machine, the a control unit comprising:

a physical quantity comparator configured to compare physical quantities that are responsive to power supplied to the respective winding sets;

a temperature estimator configured to estimate system temperatures that are temperatures of respective systems, each system being a combination of a respective one of the plurality of winding sets and its associated components; and a parameter modifier configured to modify a parameter used to estimate each system temperature in response to a result of comparison between the physical quantities.

* * * * *

UNITED STATES PATENT AND TRADEMARK OFFICE
CERTIFICATE OF CORRECTION

PATENT NO. : 9,954,470 B2
APPLICATION NO. : 15/616623
DATED : April 24, 2018
INVENTOR(S) : Ryo Kano It is certified that error appears in the above-identified patent and that said Letters Patent is hereby corrected as shown below:

In Column 6, Line 43-44 (Approx.), change

" $Vq\_a^* = \{R \times \Delta Id\_a + (L+M)s \times \Delta Iq\_a\} \times (Km/s) + \omega(L+M) \times \Delta Id\_a + 2\omega\Phi$ " to $Vq\_a^* = \{R \times \Delta Iq\_a + (L+M)s \times \Delta Iq\_a\} \times (Km/s) + \omega(L+M) \times \Delta Id\_a + 2\omega\Phi$ In Column 6, Line 46-47 (Approx.), change " $Vq\_s^* = \{R \times \Delta Id\_s + (L-M)s \times \Delta Iq\_s\} \times (Km/s) + \omega(L-M) \times \Delta Id\_s$ " to $Vq\_s^* = \{R \times \Delta Iq\_s + (L-M)s \times \Delta Iq\_s\} \times (Km/s) + \omega(L-M) \times \Delta Id\_s$ Signed and Sealed this
Second Day of October, 2018

Andrei Iancu
*Director of the United States Patent and Trademark Office*